(12) United States Patent
Kaneda et al.

(10) Patent No.: US 6,215,619 B1
(45) Date of Patent: Apr. 10, 2001

(54) TAPE CASSETTE WITH REEL BRAKE RELEASE LEVER

(75) Inventors: Hiroshi Kaneda; Masatoshi Okamura, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/340,699

(22) Filed: Jun. 29, 1999

(30) Foreign Application Priority Data

Jul. 3, 1998 (JP) .................................................. 10-188857

(51) Int. Cl.$^7$ ............................ G11B 23/02; G03B 23/02
(52) U.S. Cl. ....................... 360/132; 242/338.3; 242/343
(58) Field of Search ............. 360/132; 242/338.1–338.3, 242/343–343.2

(56) References Cited

U.S. PATENT DOCUMENTS 5,417,378    5/1995   Hashizume et al. .
5,433,398  * 7/1995   Sawada ................................. 360/132

FOREIGN PATENT DOCUMENTS 0580355    7/1993   (EP) .
2248824   10/1991   (GB) .
 467268    6/1992   (JP) .

* cited by examiner

Primary Examiner—A. J. Heinz
(74) Attorney, Agent, or Firm—Wood, Phillips, VanSanten, Clark & Mortimer

(57) ABSTRACT

A problem with the assembling of tape cassettes has been the possibility of erroneous fitting of the upper end of a coil spring that presses a release lever onto one of cylindrical bosses that cover reel brake posts. This is solved by a tape cassette comprising lower casing holding reel brake shoes that control the rotation of the reels, torsion coil springs that control the turning of the reel brake shoes, and brake posts on which the reel brake shoes and the torsion coil springs are set, the upper casing having cylindrical bosses that cover the upper portions of the brake posts of the lower casing, the bosses being contiguous to reel area partition walls formed in the upper casing, the upper casing holding a release lever that turns the reel brake shoes, and a coil spring that restricts the movement of the release lever, characterized in that a rib of the same height as each cylindrical boss is formed contiguously thereto, each rib having dimensions such that the sum of the outside diameter of the cylindrical boss and the width of the rib is greater than the inside diameter of the coil spring that presses the release lever.

6 Claims, 15 Drawing Sheets

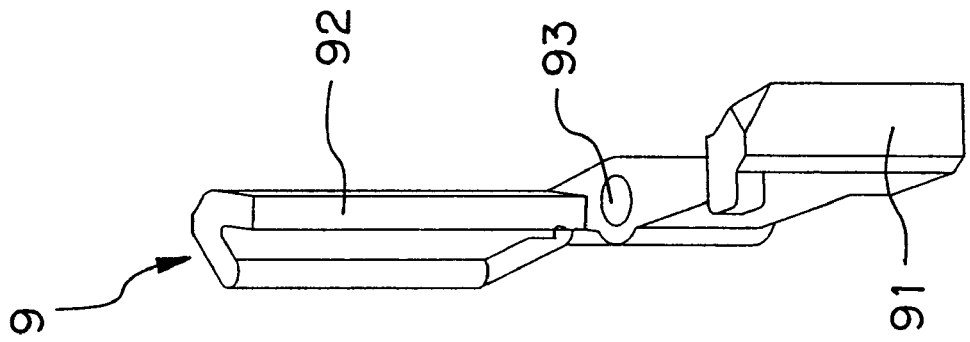
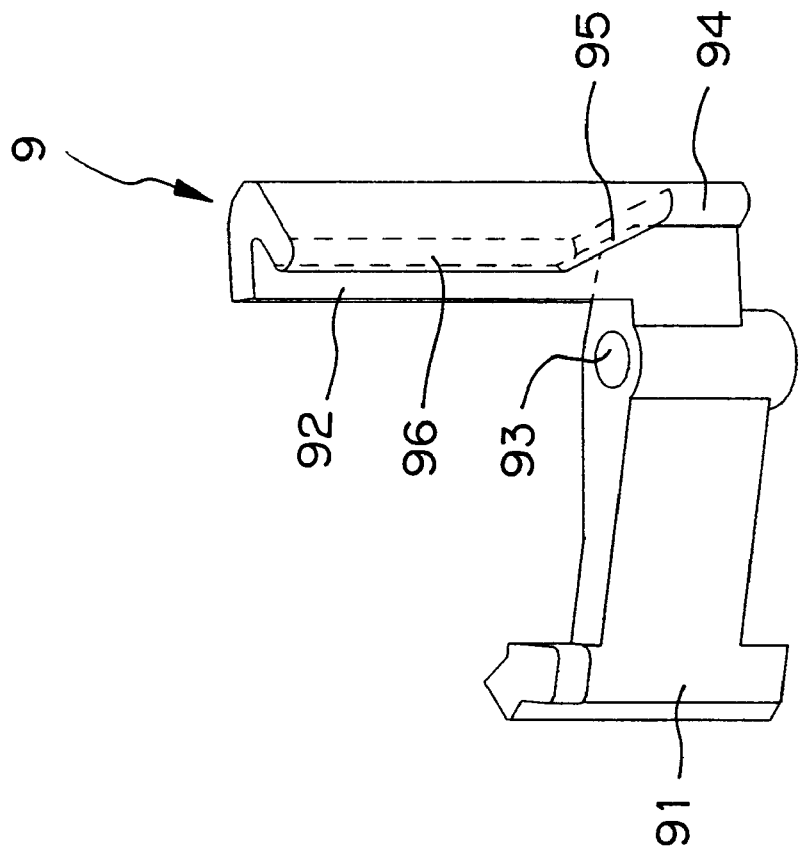
FIG.3

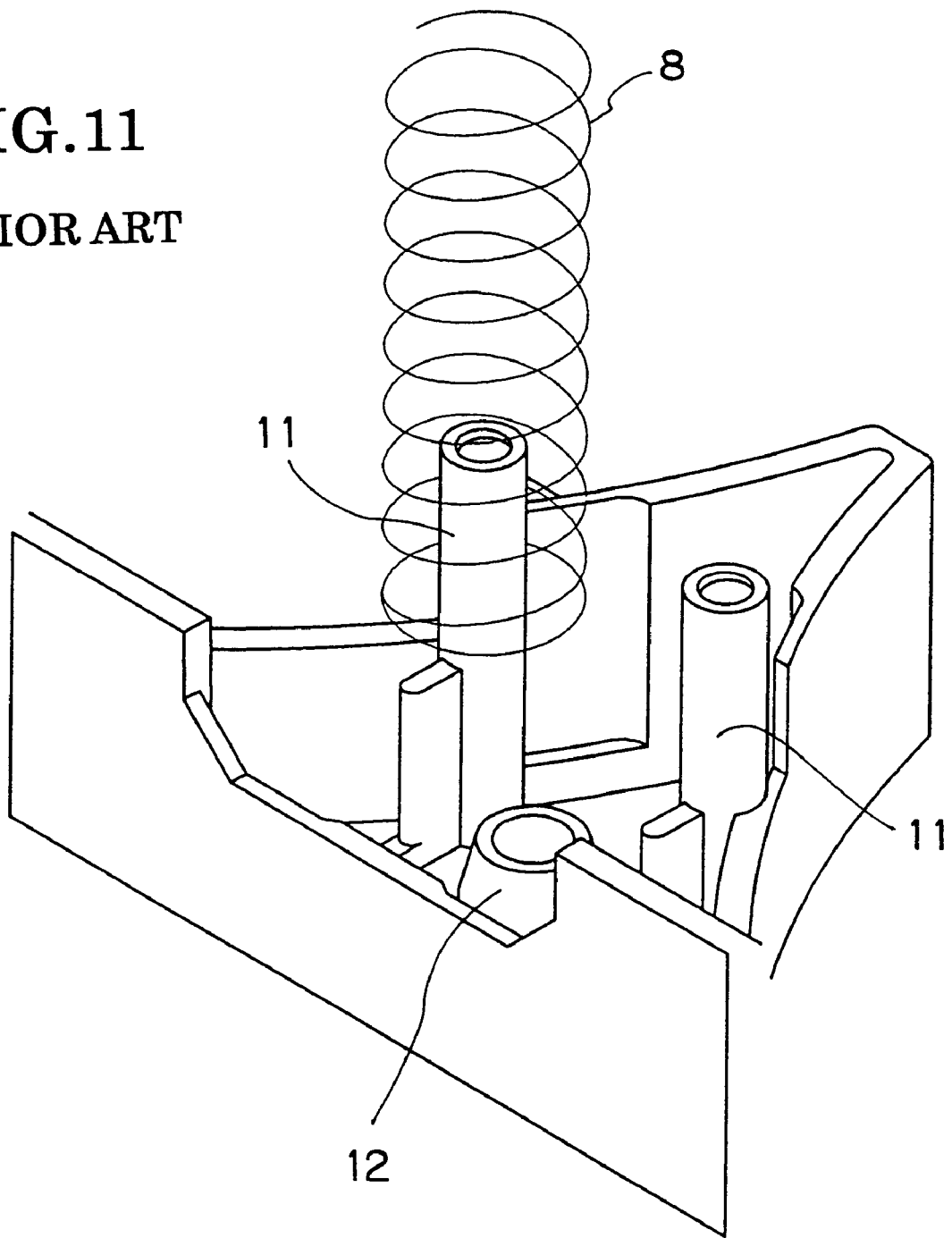

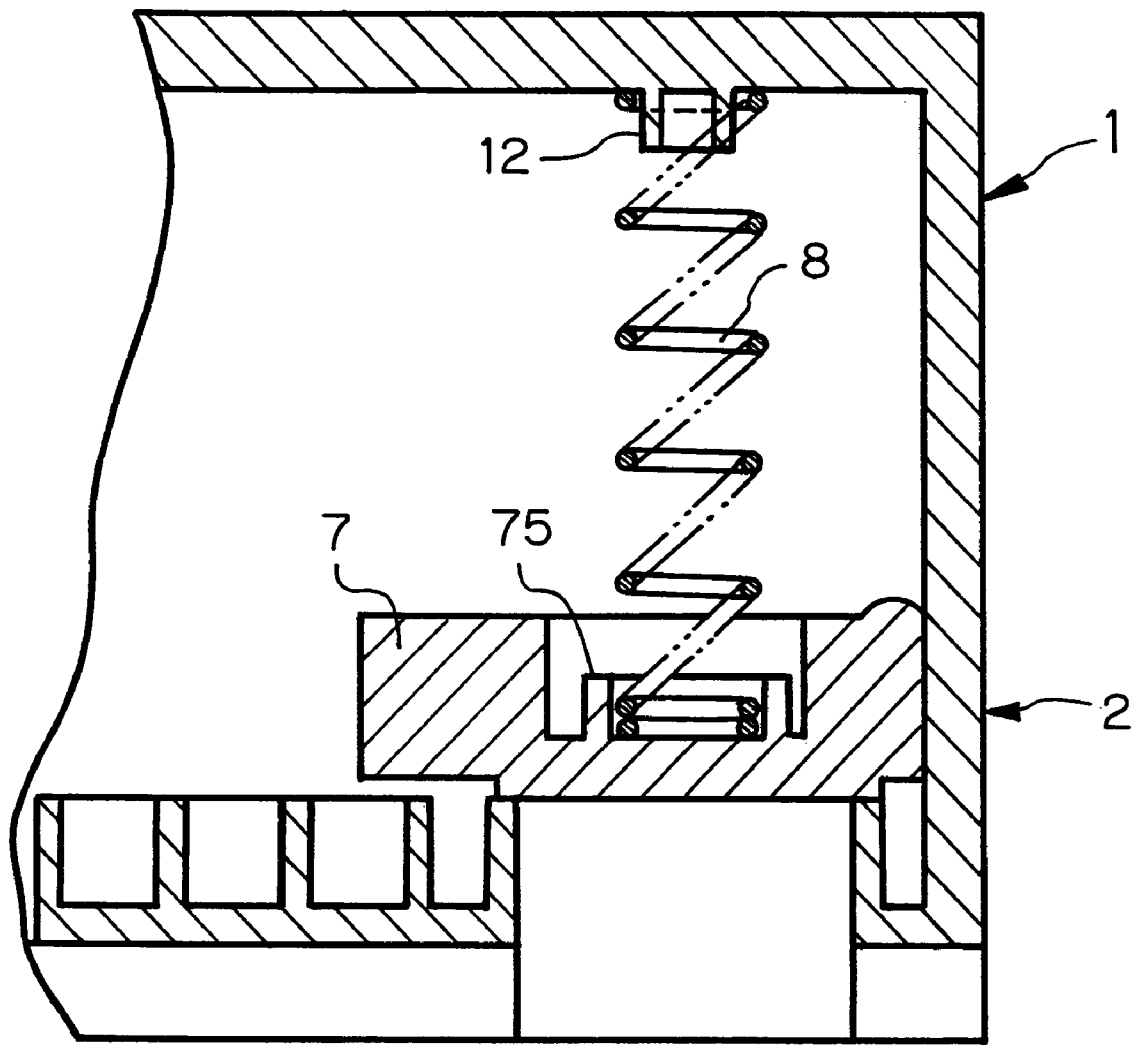

TAPE CASSETTE WITH REEL BRAKE RELEASE LEVER

FIELD OF THE INVENTION

This invention relates to a tape cassette for recording and reproducing electric signals, and more particularly to a tape cassette which holds tape reels with a length of magnetic tape wound around and is equipped with a brake mechanism for stopping the motion of the reels.

PRIOR ART

Ordinarily, as described in Japanese Utility Model Application No. 4-67268, the tape reels contained in the housing of a tape cassette, with a length of tape wound around them, are engaged with spring-biased brake shoes and are unmovably locked in position when the cassette is not used. The brake shoes are operated by means of a release lever which is moved upward and downward by a release pin of a video tape recorder that is inserted from below the cassette housing. The upward and downward movement of the release lever is restricted by a coil spring. The coil spring that controls the release lever motion are engaged at one end with the release lever and at the other end with the inner surface of the upper casing so as to keep the coil spring in position and ensure good assembling efficiency.

This will be more concretely described with reference to FIG. 1 illustrating a tape cassette of the invention (only the parts common to the prior art will be considered here) and also to FIG. 11 which depicts a cassette of the prior art. As shown, the cassette housing consisting of upper and lower casings 1, 2 holds a pair of tape reels 3 around which a length of tape 4 is wound. The tape is supplied from one reel through one of two openings formed at the front of the housing and is taken up via the other opening by the other reel. Lid members 5, 6 are provided at the front of the housing in such a manner as to protect the tape portion exposed outside the housing body. The lower casing 2 is equipped with a brake mechanism which locks the tape reels 3 while the cassette is not in use.

The brake mechanism is composed of a pair of brake shoes 9, a release lever 7, a spring member 8, and a pair of spring members 10.

Each brake shoe 9 consists of an operating arm and a claw adapted to engage with a reel 3 and is provided with a hole for reception of a brake post 21 of the lower casing 2. The brake shoes 9 are thus set on the brake posts 21 of the lower casing 2, and torsion coil springs 10 are fitted to the upper ends of the brake shoes. The coiled portion of each torsion coil spring 10 is fitted to each brake post 21 and the two end portions of the spring are engaged with a brake shoe 9 and the lower casing 2. The spring members 10 continually urge the claws of the brake shoes 9 in mesh with teeth 31 formed on the lower flanges of the tape reels 3.

The release lever 7 has a contact surface 71 that comes in contact with the tapered operating arms of the brake shoes 9, follower extensions 72 that are guided by guide walls of the lower casing 2, and a cylindrical recess 73 for holding a spring member 8. The release lever 7 is normally urged downward by the coil spring 8 that is in contact at the other end with the upper casing.

When the release lever 7 is forced upward by a brake release pin P of a VTR, its contact surface 71 comes in sliding contact with the tapered operating arms of the brake shoes 9. This causes the brake shoes 9 to turn out of engagement with the teeth 31 of the tape reels 3, allowing the reels 3 to turn freely.

As FIGS. 9 show, the interior portion of the upper casing facing the portion of the lower casing 2 where the brake mechanism is installed, has a pair of cylindrical bosses 11 formed vertically from the inner wall. The bosses are designed to confine the coils of the torsion springs fitted to the upper ends of the brake posts 21 in position. There is no space provided between the holes at the lower ends of the cylindrical bosses 11 and the upper ends of the brake posts 21, lest any deviation of the brake posts from the vertical should interrupt smooth turning of the brake shoes and bring an increased force for releasing the brake (beyond the specified value). The design also protects the torsion coil springs 10 and brake shoes 9 against disengagement due to vibration or impact and thereby prevents them from failing to function as a brake.

PROBLEM THAT THE INVENTION IS TO SOLVE

Assembling a cassette of the construction described above has presented a problem. In the course of assembling, one end of the coil spring 8 is engaged securely with the recess of the release lever 7. However, when the upper casing 1 is mated with the lower casing, the opposite end of the coil spring 8 can sometimes be wrongly displaced, onto one of the cylindrical bosses 11 on reel brake posts 21 as shown in FIG. 11 rather than onto the lug 12 with which it should normally engage as in FIG. 10. If the two casings are joined as loaded with the coil spring 8 in the wrong position as illustrated in FIG. 12, the spring will no longer function as such. When the cassette is inserted into a VTR, the pin P of the latter forces the release lever 7 of the cassette upward. When the cassette is taken out, the coil spring 8 does not work properly, keeping the release lever 7 in the upward position. As a consequence, the reel brakes 9 remain released from the tape reels, and the unfettered reels allow the tape to loosen, eventually causing troubles such as the seizure of the tape by the lid members.

The present invention is therefore aimed at precluding the possibility that the coil spring that controls the upward and downward movement of the release lever in a tape cassette might be fitted in a wrong position within the upper half casing, and thereby preventing malfunctioning of the tape cassette.

The coil spring 8 is set in the release lever 7 by inserting the spring into the cylindrical recess 73 of the lever 7. Positive engagement of the two parts is ensured, as shown in FIG. 9, by providing the cylindrical recess 73 with an annular support 75 having an adequate hollow for frictional engagement with the periphery at the lower end of the coil spring 8 and also providing a protuberance 12 on the inner wall of the upper casing to engage with the upper end of the coil spring 8.

The annular support 75 formed in the release lever of the prior art is designed to surround the entire periphery of the spring. Dispersions in the manufacture of the annular support 75 and the spring 8 can sometimes provide a spring 8 with an outside diameter greater than the inside diameter of the support 75. When this occurs, it is difficult to assemble the spring in place while keeping it circular with the reduction of the outside diameter of the coil portion at the lower end of the spring. In extreme cases the spring is set in place with its coil portion deformed elliptically and fitted in an inclined posture. Conversely if the coil portion is designed to be smaller in diameter than the support, the resulting gap is often too large to ensure a firm support.

The present invention, therefore, aims at providing a release lever which permits a spring member for controlling the upward and downward movement of the lever to be set in position simply and positively.

MEANS OF SOLVING THE PROBLEM

The above problem is solved by a tape cassette comprising a housing made up of upper and lower casings, a pair of reels around which a tape is wound and which are turnably contained in the housing, said lower casing holding reel brake shoes that control the rotation of said reels, torsion coil springs that control the turning of said reel brake shoes, and brake posts on which said reel brake shoes and said torsion coil springs are set, said upper casing having cylindrical bosses that cover the upper portions of said brake posts of said lower casing, said bosses being contiguous to reel area partition walls formed in the upper casing, said upper casing holding a release lever that turns said reel brake shoes, and a coil spring that restricts the movement of said release lever, characterized in that a rib of the same height as each said cylindrical boss is formed contiguously thereto, each said rib having dimensions such that the sum of the outside diameter of said cylindrical boss and the width of said rib is greater than the inside diameter of said coil spring that presses said release lever.

The rib may include a part of a reel area partition wall of the upper casing, and each cylindrical boss and reel area partition wall may be bridged with a connecting rib of the same height as the cylindrical boss. This rib may be replaced by one or more radial ribs formed around each cylindrical boss and which extend axially of the boss. It may seem possible to provide cylindrical bosses each having an outside diameter at the bottom larger than the inside diameter of the coil spring. However, this is not feasible because of the great difficulties that would be involved in the construction of the mold for its manufacture. Another possible attempt may be providing cylindrical bosses each having an outside diameter throughout greater than the inside diameter of the coil spring. However, it would produce a shrinkage pattern on the outer side of the upper casing at the time of molding, eventually marring the appearance of the tape cassette.

The present invention further provides a tape cassette comprising a housing made up of upper and lower half casings, a pair of reels around which a tape is wound and which are turnably contained in the housing, reel brakes that control the rotation of said reels, a release lever that is moved upward and downward by a release pin of a video tape recorder, said release lever being movable upward and downward along the front wall of the lower casing thereby to turn said reel brakes, and a spring member for controlling the upward and downward movement of said release lever, characterized in that said release lever has a recess to receive the spring member and that said recess has ribs formed for the pressure fitting of said spring member.

The ribs are preferably formed at three points, each rib being sloped at its upper end.

One of the three ribs is preferably lower than the remainder. The ribs formed, as described above, at the three points on the inner surrounding wall of the recess for the pressure fitting of the coil portion at the lower end of the spring (i.e., the ribs so designed that their inscribed circle has a diameter slightly smaller than the outside diameter of the spring) ensure positive and accurate setting of the spring in position, regardless of dispersions in the outside diameter of the coil portion at the lower end of the spring and in the inside diameter of the recess.

Sloping the upper ends of the ribs facilitates the setting. Further, reducing the height of one rib from the rest makes the assembling easier.

BRIEF EXPLANATION OF THE DRAWINGS

FIG. 3(a) shows, in perspective, one view of a brake shoe employed in the invention.

FIG. 3(b) shows, in perspective, from another angle, the brake shoe.

FIG. 11 is a perspective view showing the relation between cylindrical bosses and a coil spring in the upper casing of the prior art.

FIG. 15 shows, in cross section, how a coil spring is conventionally set in place.

PREFERRED EMBODIMENTS OF THE INVENTION

The construction of a tape cassette according to this invention will now be explained in detail with reference to FIGS. 1 to 8.

Figure 1:
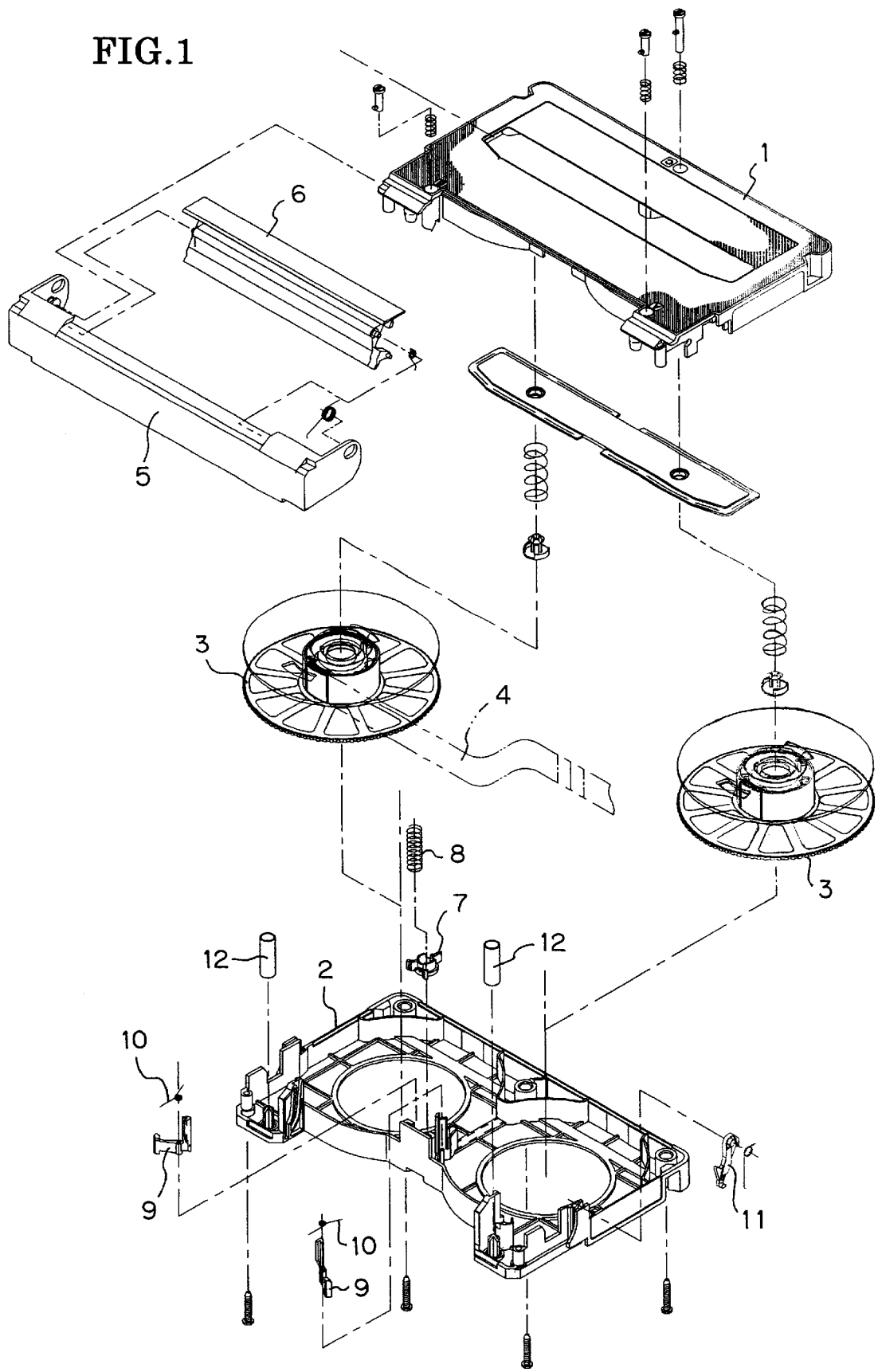
FIG. 1 is an exploded view of a tape cassette embodying the present invention.

As illustrated in FIG. 1, the cassette housing consisting of upper and lower casings 1, 2 holds a pair of tape reels 3 around which a length of tape 4 is wound. The tape is supplied from one reel through one of two openings formed at the front of the housing and is taken up via the other opening by the other reel. Lid members 5, 6 are provided at the front of the housing in such a manner as to protect the tape portion exposed out of the housing body. The lower casing 2 is equipped with a brake mechanism which locks the tape reels 3 while the cassette is not in use.

Next, the brake mechanism will be explained. As FIGS. 1 and 2 depict, the brake mechanism comprises a pair of brake shoes 9, a release lever 7, a spring member 8, and a pair of spring members 10.

Figure 2:
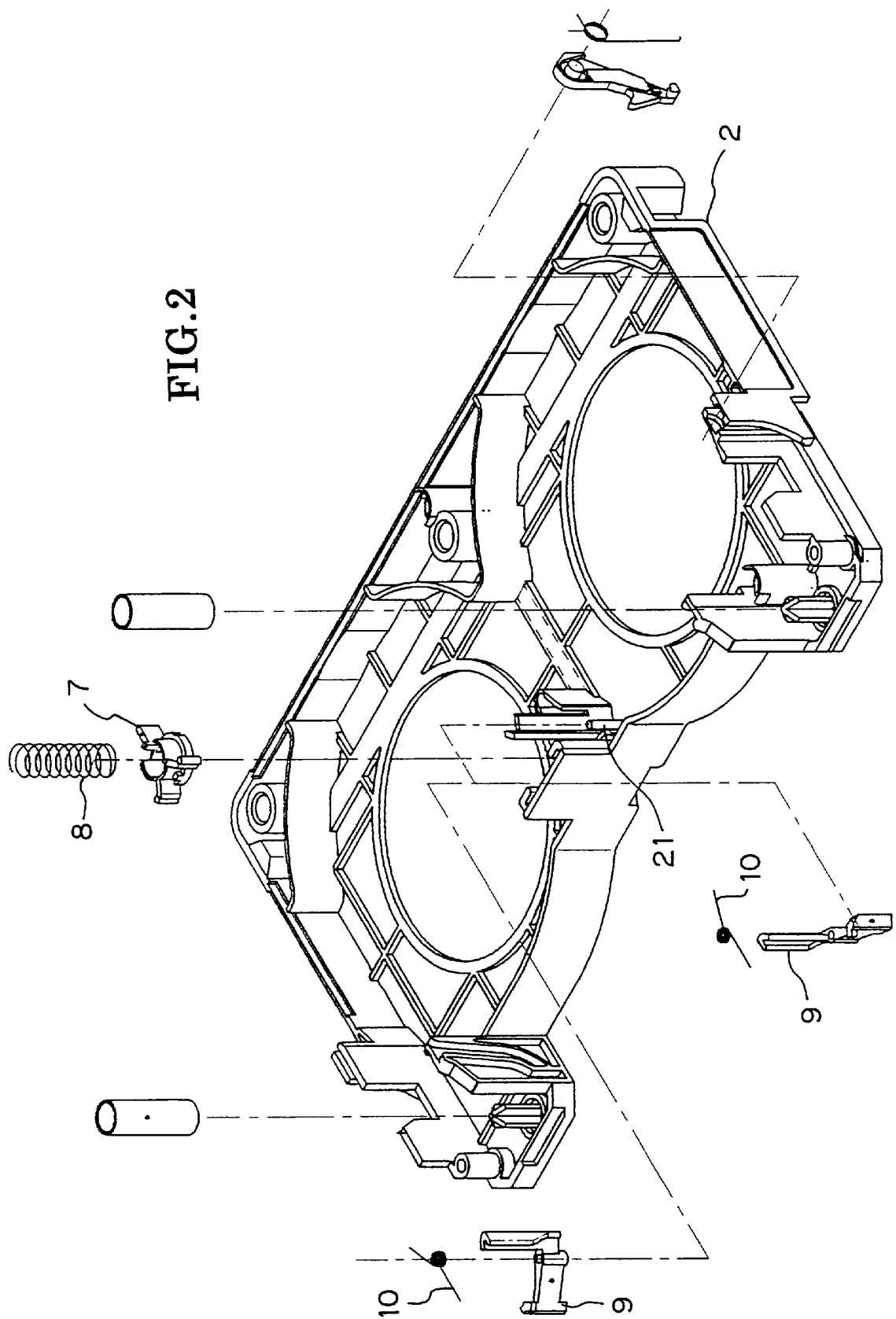
FIG. 2 is an exploded view of the lower casing of the tape cassette housing and components to be set in the casing in accordance with the invention.

The brake shoes 9 are symmetrically shaped, as shown in FIGS. 2 and 3, each consisting of an operating arm 92 and a claw 91 formed in one piece with the arm and provided with a hole 93 for reception of a brake post 21 of the lower casing 2. The operating arm 92 of each brake shoe has a lower contact surface 94, a tapered contact surface 95, and an upper contact surface 96 of a combined contour such that the sliding contact between the arm 92 and the contact surface 71 produces a cam action to turn the brake shoe 9 as desired. The coil spring 8, at both its upper and lower ends, has two or three turns wound closer than in the remainder.

Figure 6A:
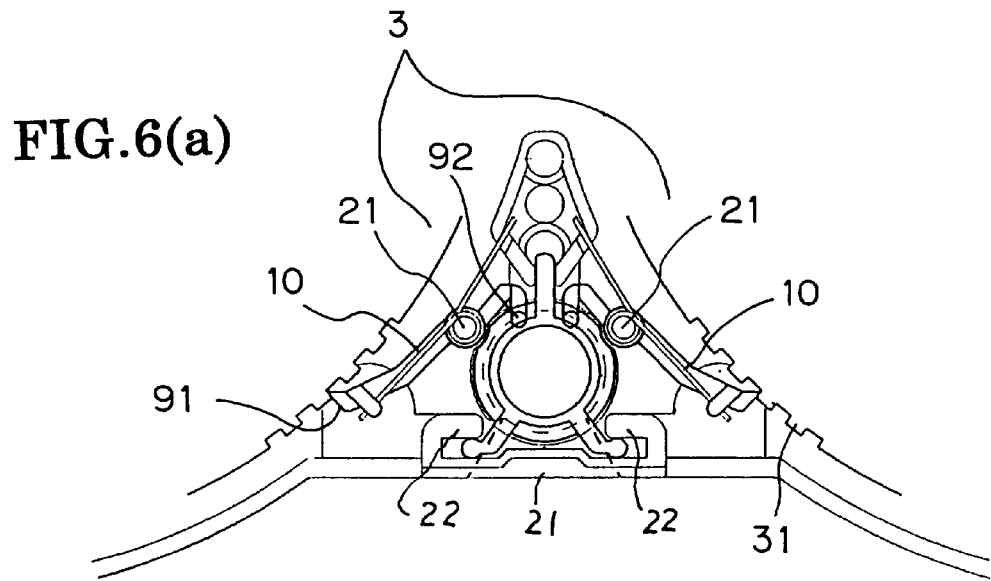
FIG. 6 shows the essential parts of the invention (when the brake is applied), FIG. 6(a) being a plan view and FIG. 6(b), a front view with the front wall broken away.
Figure 6B:
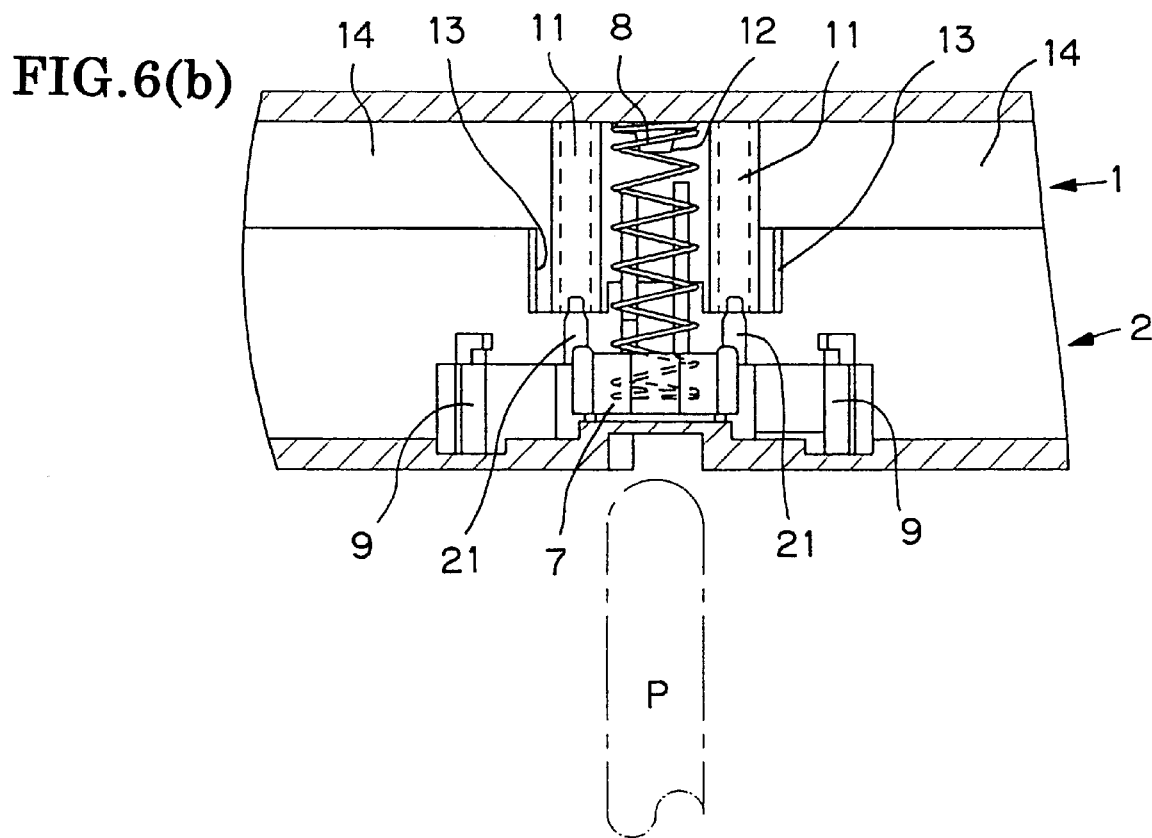

As the assembly shown in FIG. 6 indicates, the brake shoes 9 are fitted, with their holes 93, onto the brake posts 21 of the lower casing 2. Torsion coil springs 10 are set in place on the brake shoes. The coiled portion of each torsion coil spring 10 is fitted to the exposed top portion of each brake post 21 and the two end portions of the spring are engaged with a brake shoe 9 and the lower casing 2. The spring members 10 continually urge the claws 91 in mesh with teeth 31 formed on the lower flanges of the tape reels 3.

Figure 4A:
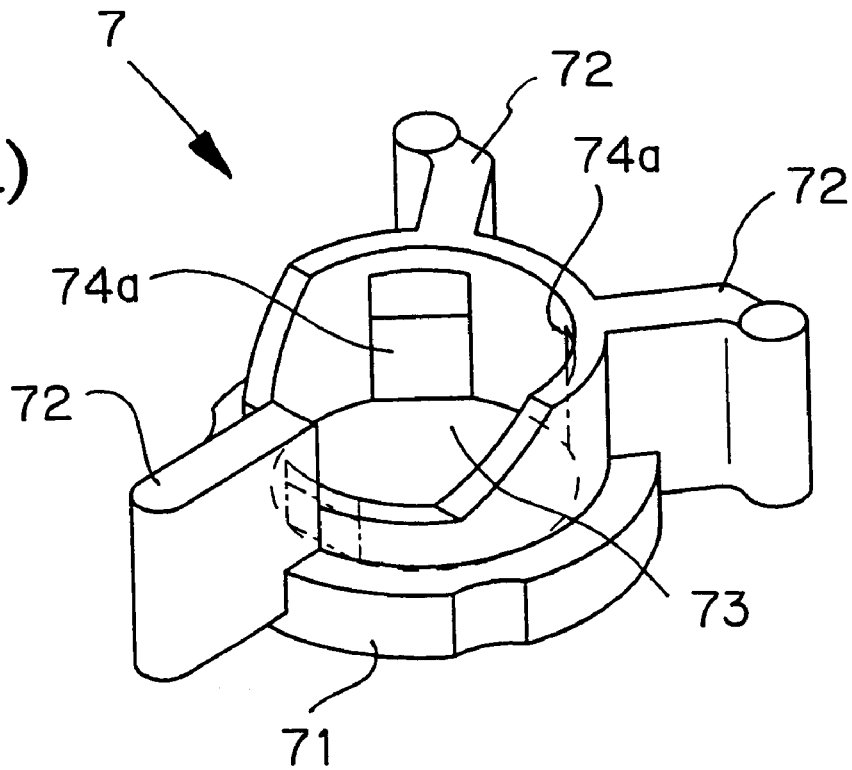
FIG. 4 shows, in perspective, a release lever of the invention, FIG. 4(a) being a back view and FIG. 4(b), a front view.
Figure 4B:
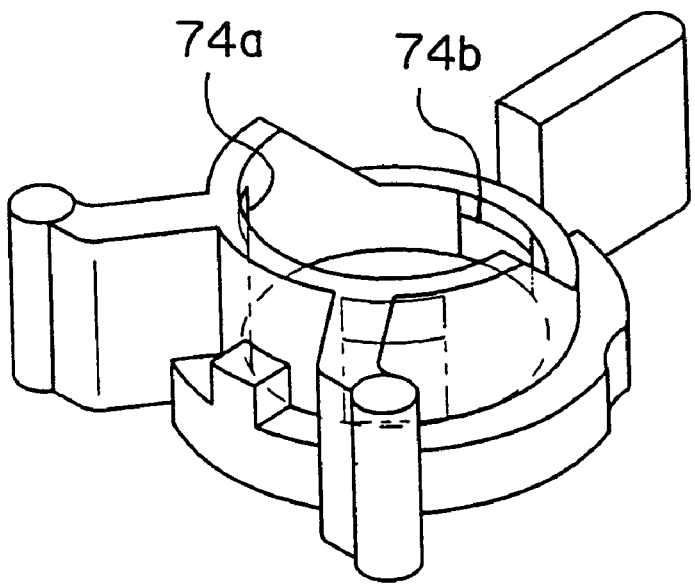

The release lever 7, as shown in FIGS. 2 and 4, has a contact surface 71 that comes in contact, in succession, with the contact surfaces 94, 95, and 96 of the operating arms 92 of the brake shoes 9 during the ascent of the lever (or in the reverse order during the descent), follower extensions 72 that are guided by guide walls 22 of the lower casing 2, a cylindrical recess 73 for holding a coil spring 8, and a rib 74 provided on the inner surface of the recess 73 to allow the lower end of the coil spring 8 to be forced fixedly in the recess.

Figure 7A:
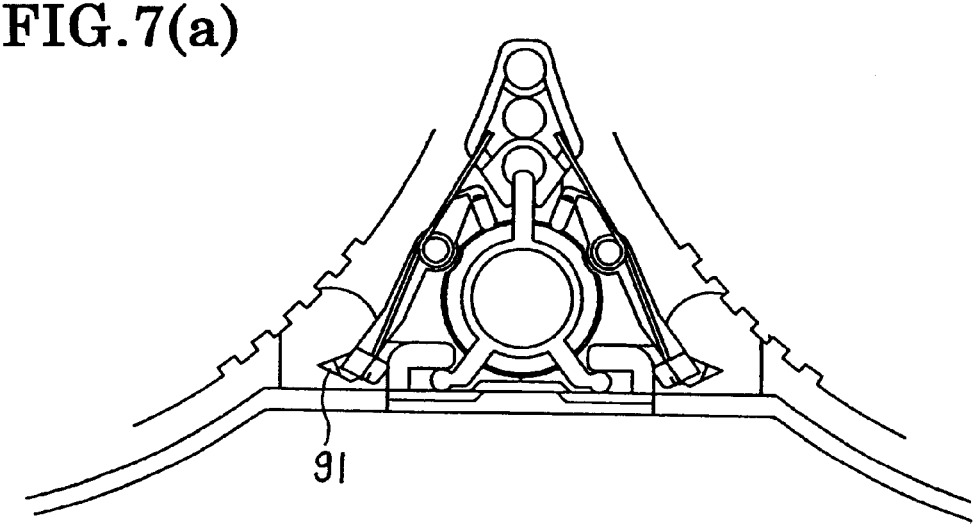
FIG. 7 shows the essential parts of the invention (when the brake is released), FIG. 7(a) being a plan view and FIG. 7(b), a front view with the front wall broken away.
Figure 7B:
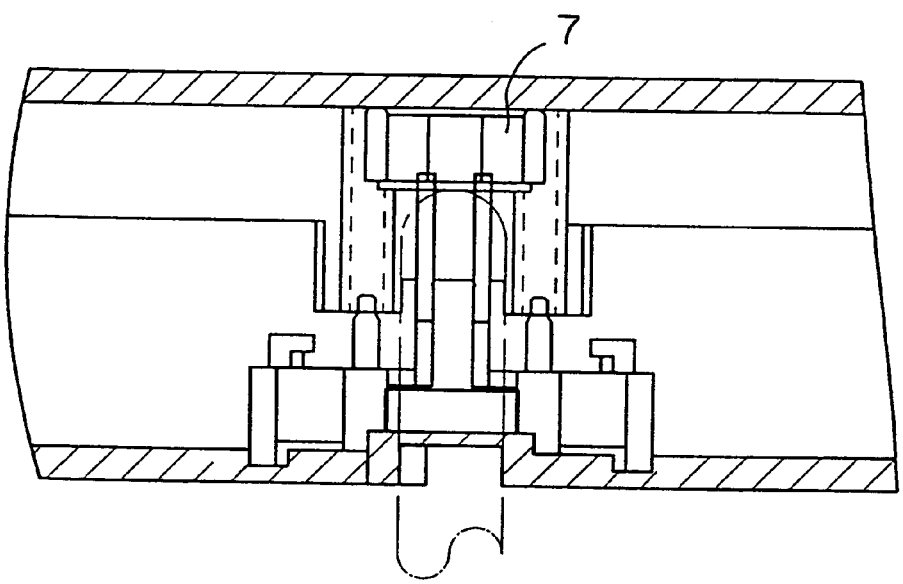

As illustrated in FIG. 6, the release lever 7 is urged downward by the coil spring 8, which is fitted on a lug 12 of a cylindrical boss formed on the inner surface of the upper casing 1. When the release lever 7 is forced upward by a brake release pin P of a VTR, its contact surface 71 comes in sliding contact with the contact surfaces 94, 95, and 96, in the order of mention, of the operating arms 92 of the brake shoes 9. This causes the brake shoes 9 to turn out of engagement with the teeth 31 of the tape reels 3, allowing the reels 3 to turn freely. FIG. 7 shows the relationship of the components of the brake mechanism when the brake is released.

Figure 5A:
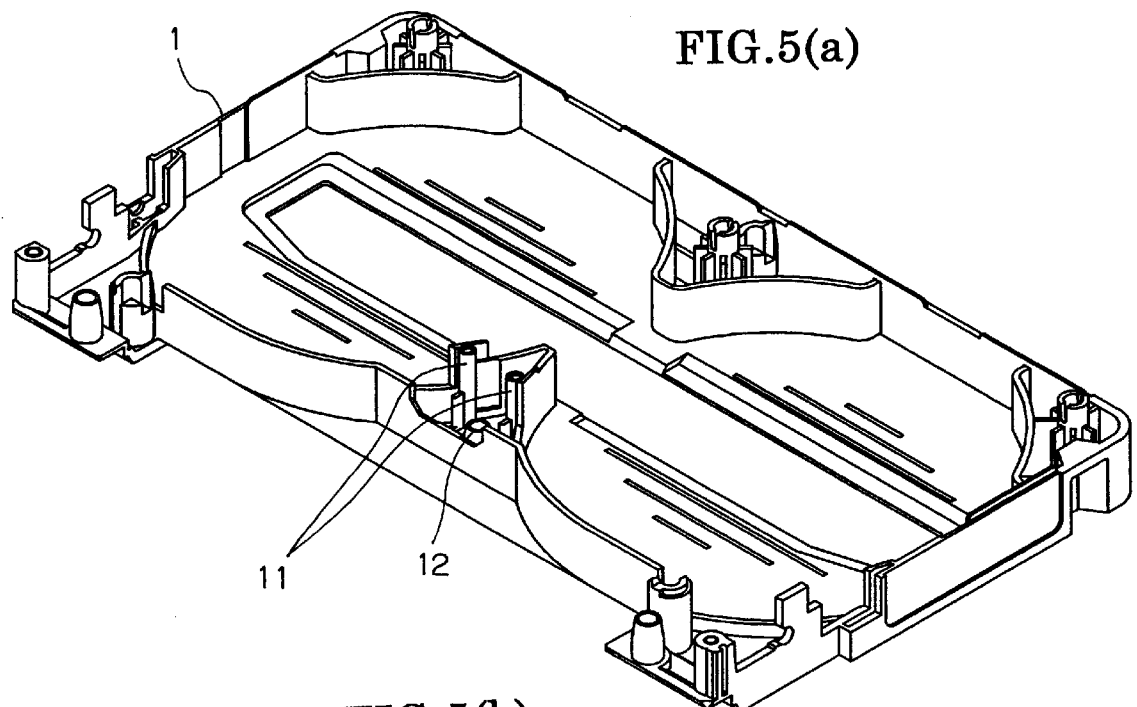
FIG. 5 shows, in perspective, the upper casing according to the invention, FIG. 5(a) being a general view and FIG. 5(b), an enlarged view of the essential parts of the casing.
Figure 5B:
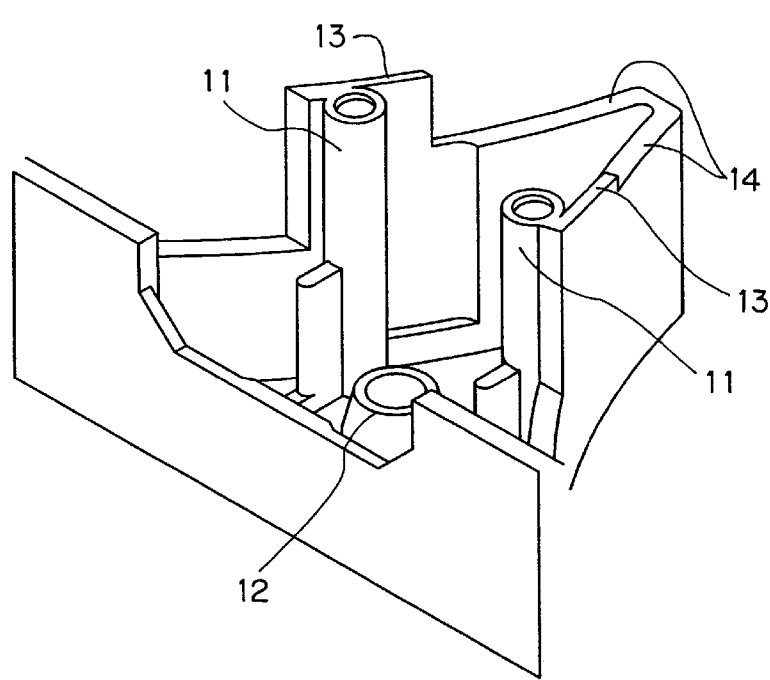
Figure 8:
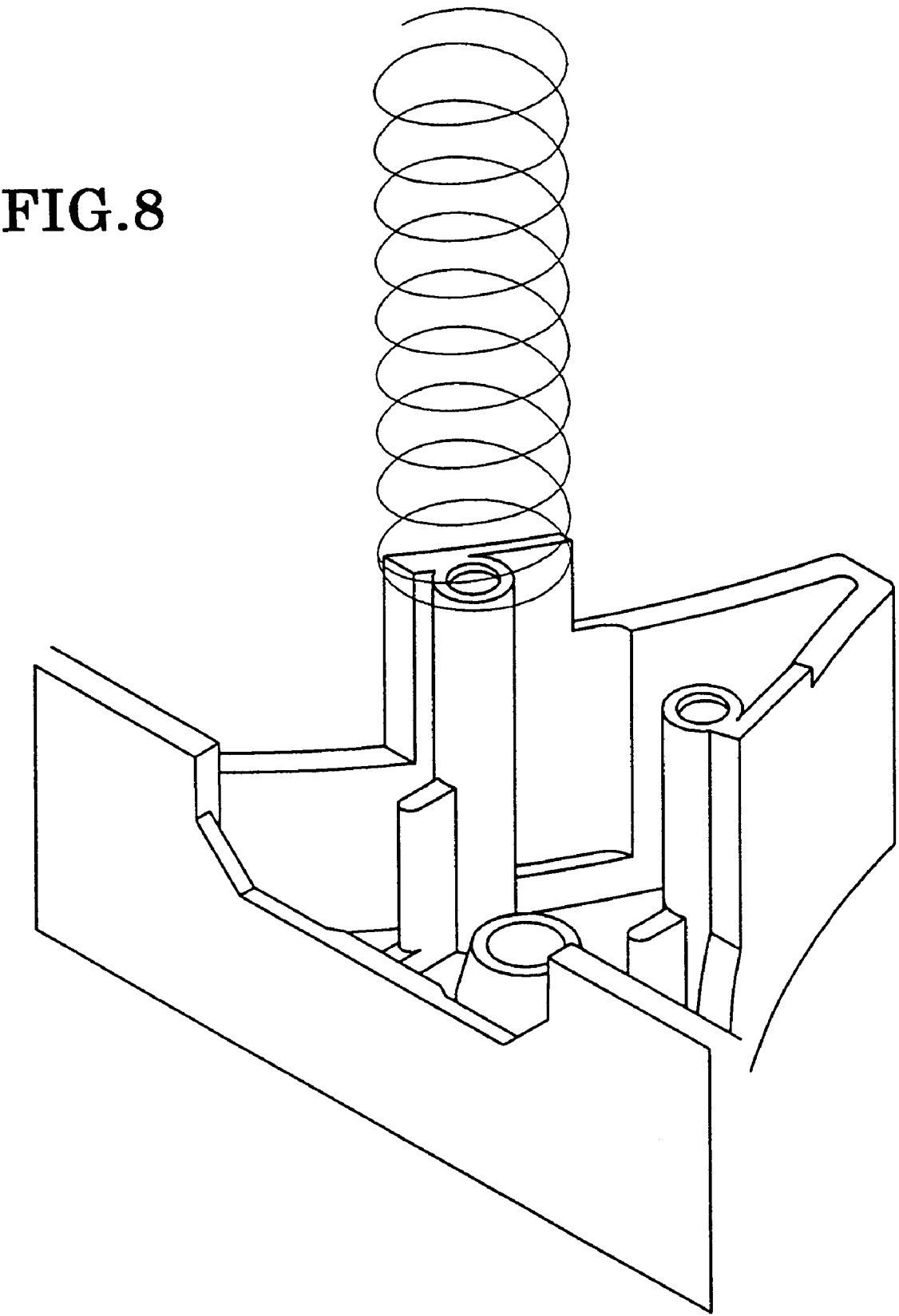
FIG. 8 is a perspective view showing the relation between cylindrical bosses and a coil spring in the upper casing.
Figure 9A:
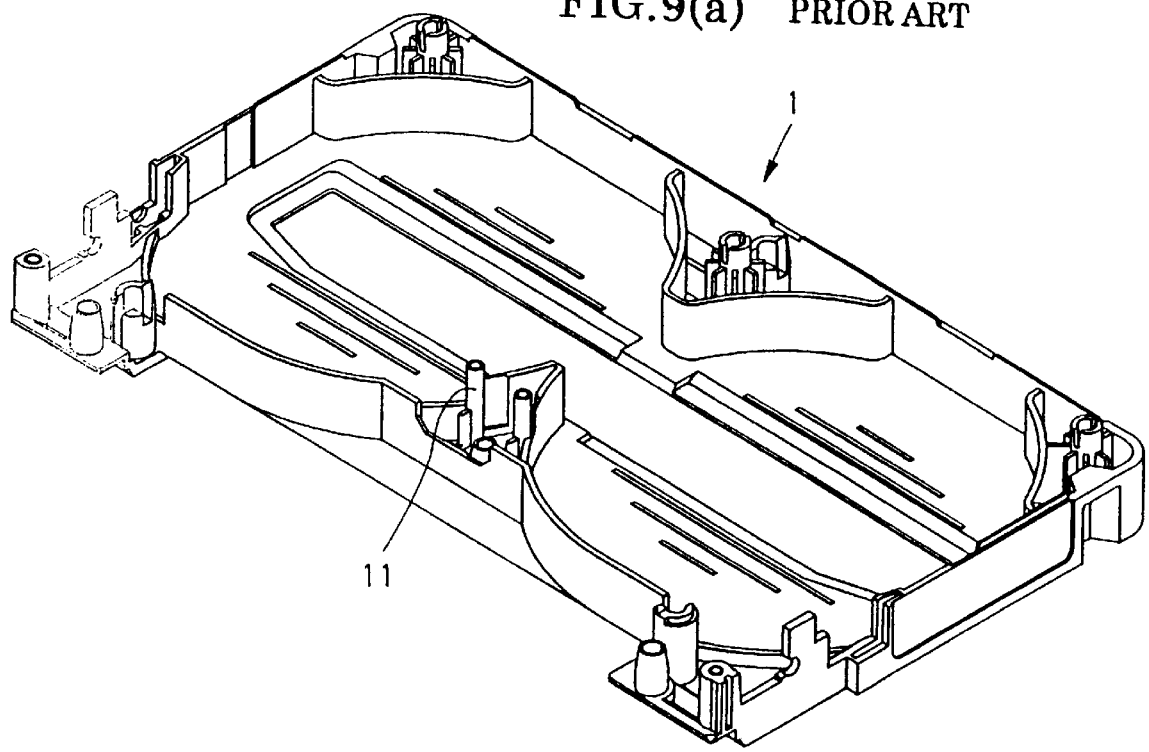
FIG. 9 shows, in perspective, the upper casing of a conventional tape cassette housing, FIG. 9(a) being a general view and FIG. 9(b), an enlarged view of the essential parts of the casing.
Figure 9B:
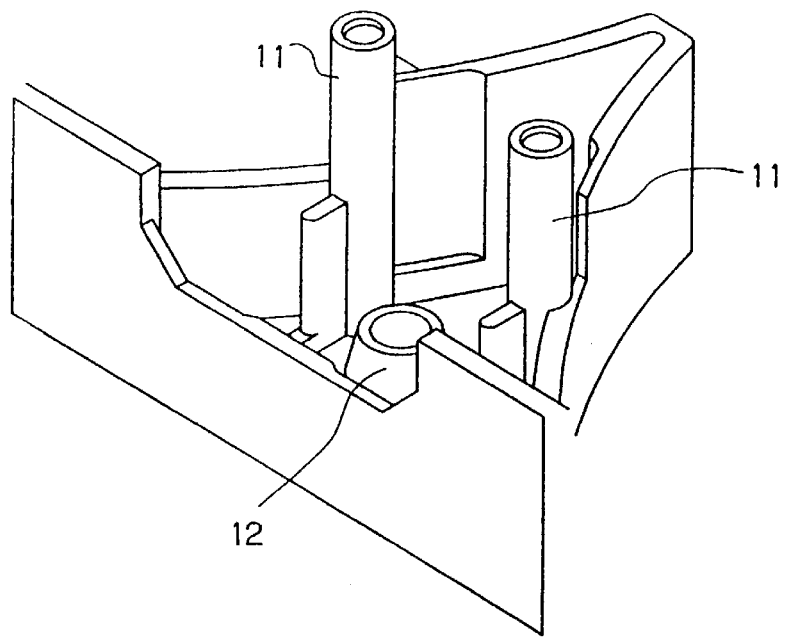
Figure 10A:
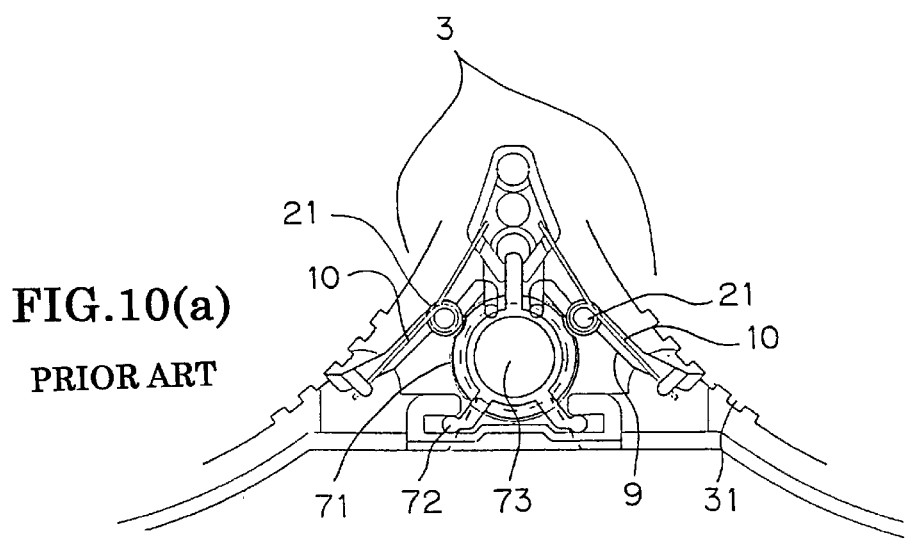
FIG. 10 shows a conventional brake mechanism (when the brake is applied), FIG. 10(a) being a plan view and FIG. 10(b), a front view with the front wall broken away.
Figure 10B:
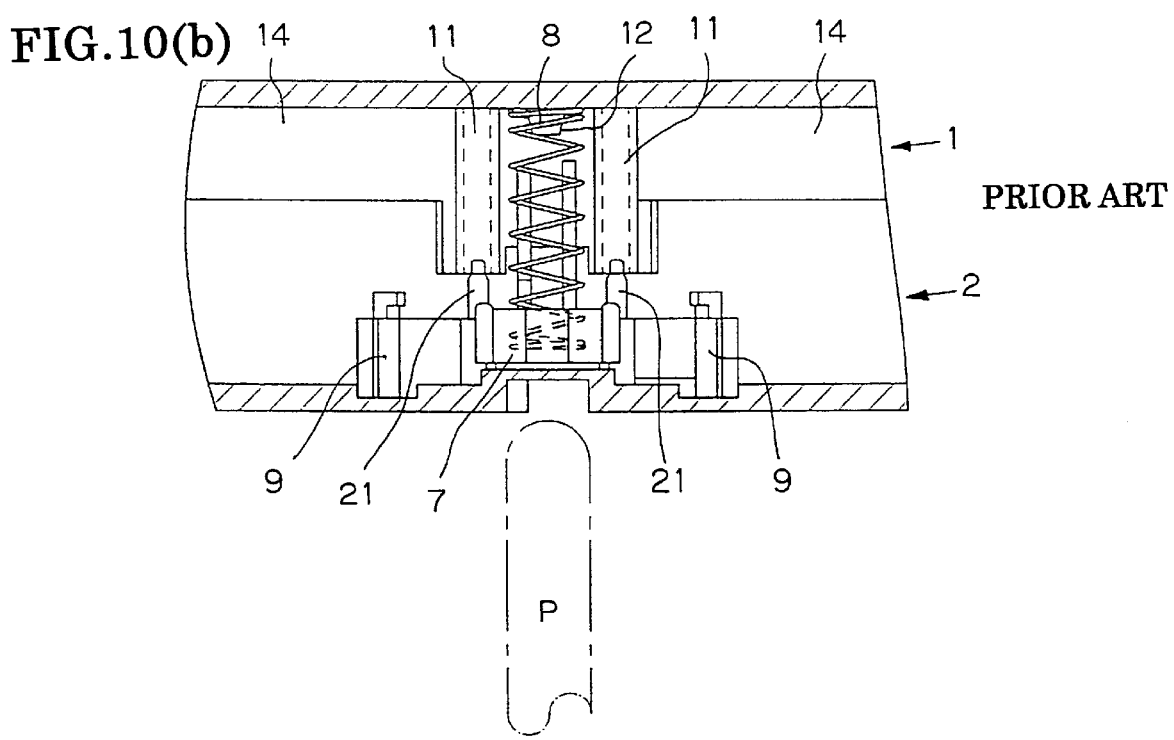
Figure 12A:
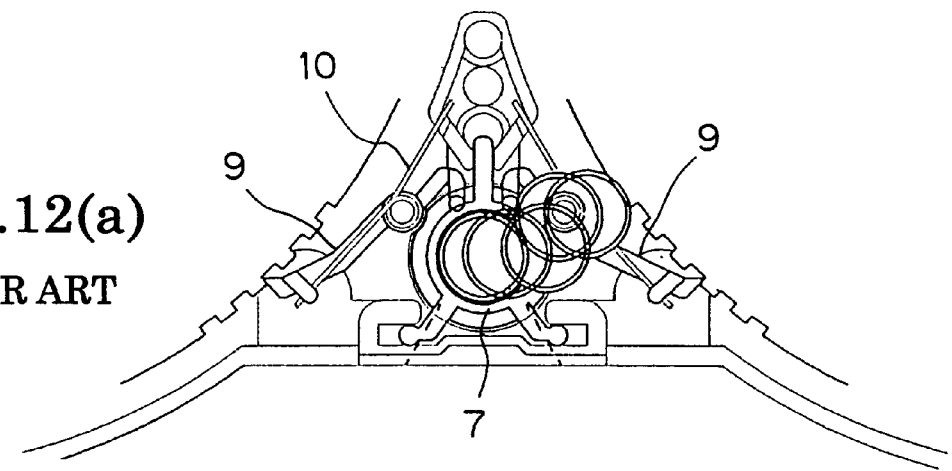
FIG. 12 shows a conventional coil spring set in a wrong position, FIG. 12(a) being a plan view and FIG. 12(b), a front sectional view.
Figure 12B:
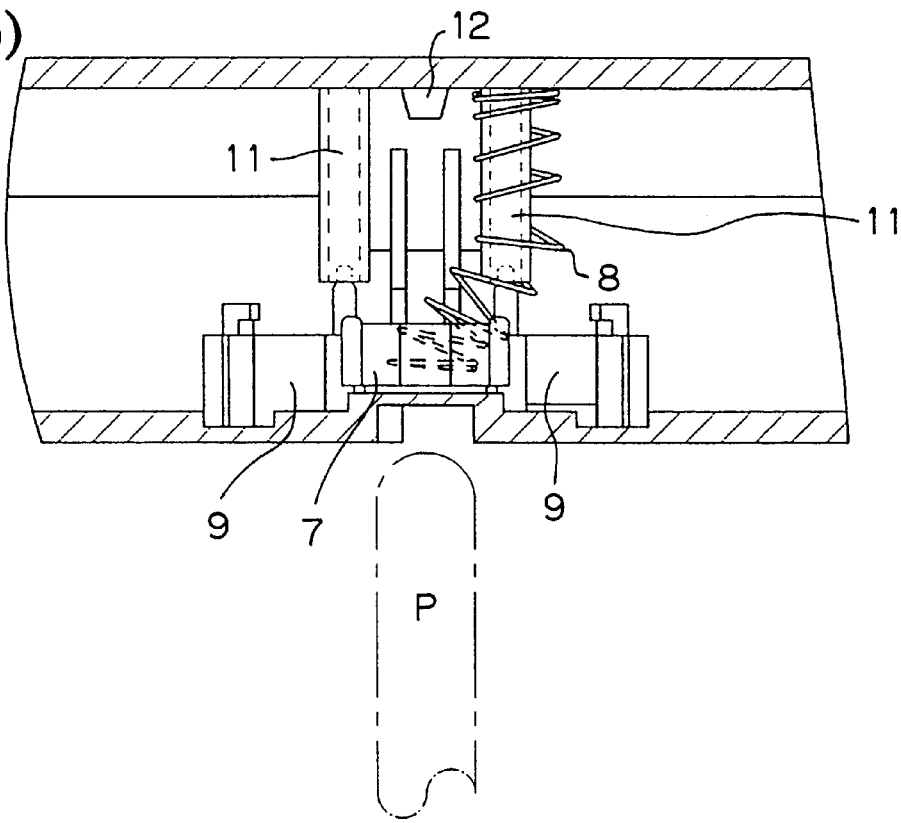

FIG. 5 shows the interior of the upper casing 1, in which there are formed a pair of cylindrical bosses 11 each having a hole open at the end to receive a brake post 21, and also a lug 12 on which the upper end of the coil spring 8 fits. Close to the cylindrical bosses 11, a pair of reel area partition walls 14 are joined in an inverted V pattern. The partition walls 14 are extended to form connecting ribs 13 of substantially the same height as the cylindrical bosses 11. These portions are formed contiguously to the cylindrical bosses and are large enough to leave no space where the hollow of the coil spring 8 can rest (FIG. 8).

Alternatively, the cylindrical bosses 11 and the partition walls 14 are not integrally joined together. Each cylindrical boss may instead be formed in one piece with one or more radial ribs of dimensions such that the sum of the widths of each cylindrical boss 11 and each rib is greater than the inside diameter of the coil spring and the height of each rib is substantially the same as that of each cylindrical boss 11.

The assembling of the tape cassette will now be described. The release lever 7 is set at a designated point in the lower casing 2, and the coil spring 8 for the release lever 7 is fitted in the recess 73 of the lever. Similarly the brake shoes 9 are set in position, with their holes 21 onto the brake posts 21 of the lower casing 2, and the torsion coil springs 10 of the reel brakes are fitted to the brake posts 21. Then, the tape reels 3 are placed in position inside the lower casing 2. Care must be used to ensure that the claws 91 of the reel brake shoes 9 are in mesh with the teeth 31 formed around the lower flanges of the tape reels 3.

The step that follows comprises mating the upper casing 1 to which the lid members 5, 6 are temporarily fixed, with the lower casing 2. At this time the opposite end of the coil spring 8 of the release lever 7 is set in position, in engagement with the lug 12 of the upper case 1.

During the setting there is no possibility of the spring 8 fitting onto either cylindrical boss 11, because the cylindrical bosses are formed with the ribs 13 of the same height and of dimensions larger than the inside diameter of the coil of the spring member 8.

In the illustrated embodiment the reel area partition walls 14 are partly raised to a height equal to the cylindrical bosses 11 as the ribs 13 integrally adjoining the bosses. The ribs may be replaced, as described above, by separate ribs formed in one piece with the cylindrical bosses 11.

The present invention enhances the efficiency of assembling of tape cassettes, especially when setting components in the lower casing of the cassette housing and joining the casing with the upper casing, because the invention precludes the possibility of the coil spring of the release lever fitting onto either cylindrical boss of the upper casing.

Figure 13A:
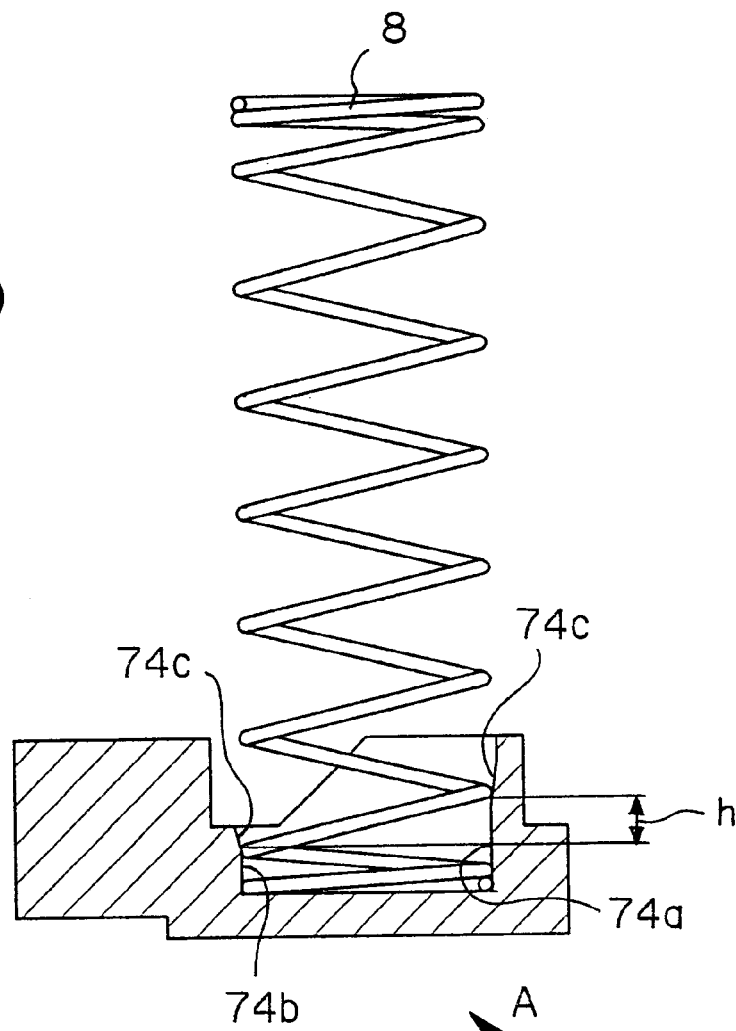
FIG. 13 shows, in cross section, a release lever of the invention as combined with a spring member, FIG. 13(a) being a section taken on the line A—A of FIG. 13(b) and FIG. 13(b), a plan view.
Figure 13B:
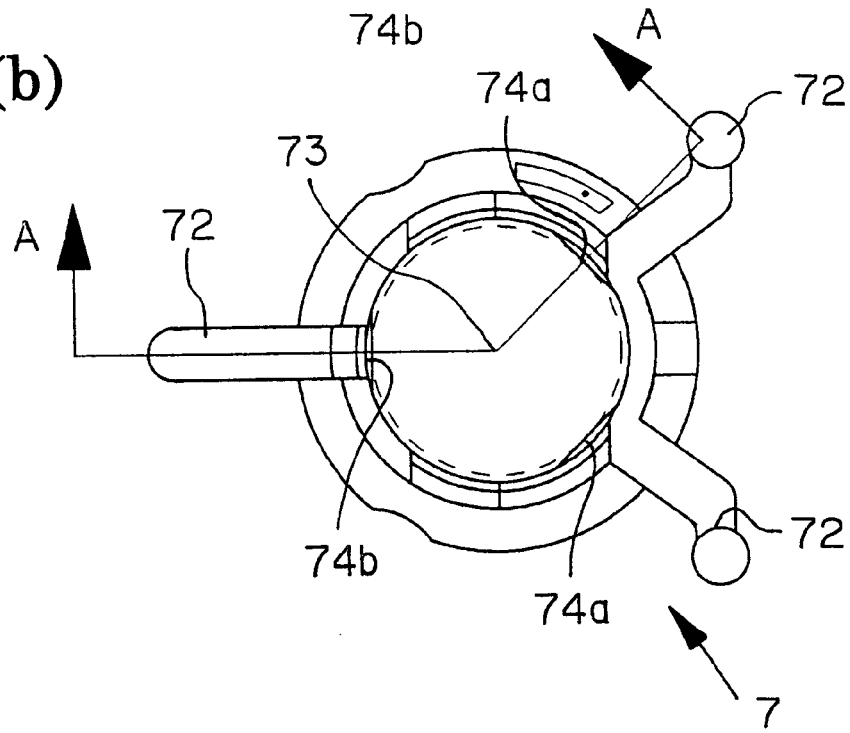

Turning to another embodiment, Ribs 74 for pressure fitting are provided at three points (74a, 74a, 74b) on the inner wall of the recess 73. As shown in FIGS. 4 and 13, these ribs 74 slightly protrude toward the inner center from the inner wall of the recess 73. The ribs, three in all, are enough to fix the spring member securely. If a continuous rib were formed all along the inner wall, it would rather hamper the fitting of the coil at the lower end of the spring member or would cause an inclination of the spring due to deformation. The upper end portions of the ribs 74 are sloped as at 74c to facilitate the engagement and locking (pressure fitting) of the spring member 8 in place.

Figure 14C:
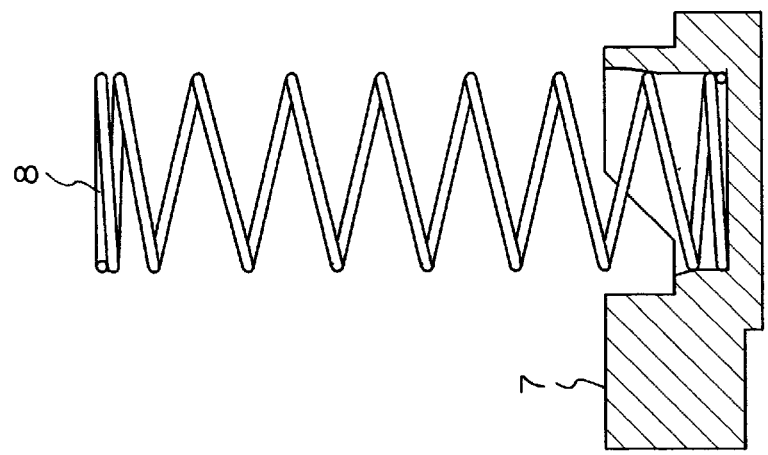
FIG. 14 shows, in cross section, the sequence of steps (a), (b), and (c) in which the spring member is fitted in the release lever.
Figure 14B:
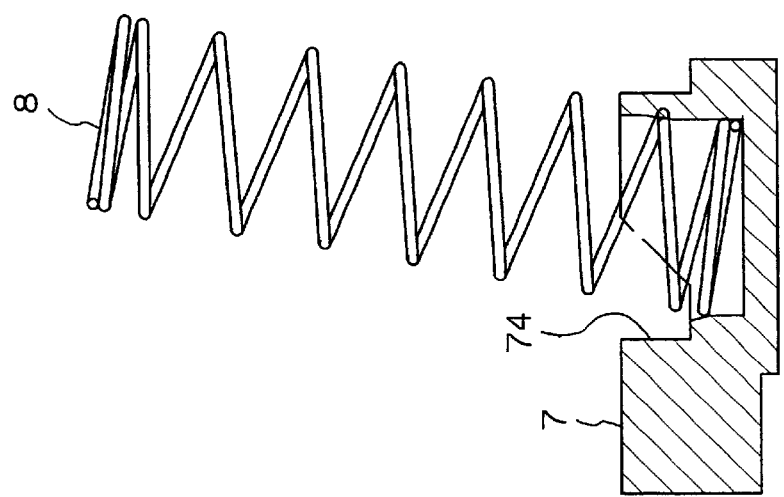
Figure 14A:
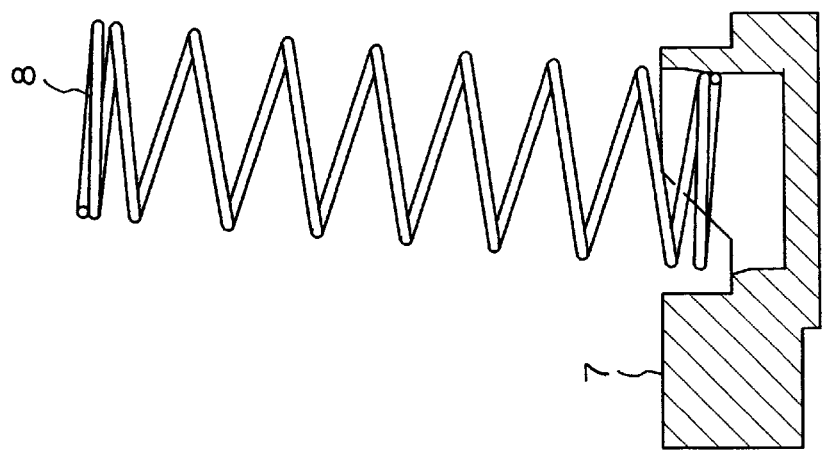

Further, as shown in FIG. 13, one of the ribs 74, i.e., 74b, is made lower than the other ribs 74a. When the spring member 8 is to be inserted in place, it is first introduced into the recess from the side of the higher ribs 74a as shown in FIG. 14(a). It is then forced downward on the side of the low rib 74b as in FIG. 14(b). Thus the insertion efficiency is improved without any possibility of deforming the spring as shown in FIG. 14(c). When the difference in height (h) between the ribs 74 is more than double the wire diameter of the spring member, the insertion is facilitated and adequate engagement and locking in position is attained.

The present invention enhances the efficiency of tape cassette assembling because it facilitates the setting of a spring member in a release lever for engagement (pressure fitting) positively in proper position.

What we claim is:

1. A tape cassette comprising a housing made up of upper and lower casings, a pair of reels around which a tape is wound and which are turnably contained in the housing, said lower casing holding reel brake shoes that control the rotation of said reels, torsion coil springs of a predetermined inside diameter that control the turning of said reel brake shoes, and brake posts on which said reel brake shoes and said torsion coil springs are set, said upper casing having cylindrical bosses that cover the upper portions of said brake posts of said lower casing, said bosses being contiguous to reel area partition walls formed in the upper casing and having a predetermined height and outside diameter, said upper casing holding a release lever that turns said reel brake shoes, and a coil spring that restricts the movement of said of said release lever, characterized in that a rib having a width and of a height substantially the same as said predetermined height as each said cylindrical boss is formed contiguously thereto, each said rib having dimensions such that the sum of the outside diameter of said cylindrical boss and the width of said rib is greater than the inside diameter of said coil spring that presses said release lever.

2. The tape cassette according to claim 1, wherein each said rib is a connecting rib that connects each said cylindrical boss with each said reel area partition wall.

3. The tape cassette according to claim 1, wherein each said rib is a radial rib formed around said cylindrical boss in one piece therewith.

4. A tape cassette comprising a housing made up of upper and lower half casings having front walls, a pair of reels around which a tape is wound and which are turnably contained in the housing, reel brakes that control the rotation of said reels, a release lever that is moved upward and downward by a release pin of a video tape recorder, said release lever being movable upward and downward along the front wall of the lower casing thereby to turn said reel brakes, and a spring member for controlling the upward and downward movement of said release lever characterized in that said release lever has a recess to receive a lower end portion of said spring member and that said recess has ribs formed at least three points of an inner surrounding wall of said recess for the pressure fitting of said spring member.

5. The tape cassette according to claim 4, wherein each said rib has an upper end and is sloped at the upper end thereof.

6. The tape cassette according to claim 5, wherein said ribs are formed at three points, each rib being sloped at the upper end thereof, one of the three ribs being lower than the remainder.

* * * * *